FIG I

INVENTOR.
Donley S. Collins
BY
Seegert & Schwalbach
Att'ys

Nov. 29, 1960
D. S. COLLINS
2,962,036
CONTROL DEVICE
Filed Feb. 13, 1957
2 Sheets-Sheet 2
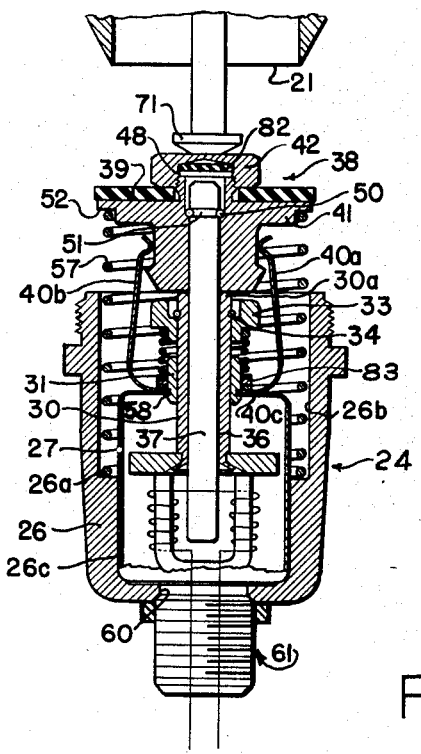
Fig 2
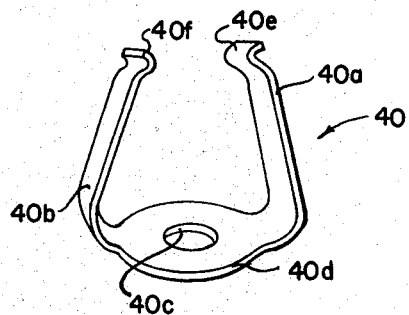
Fig 5
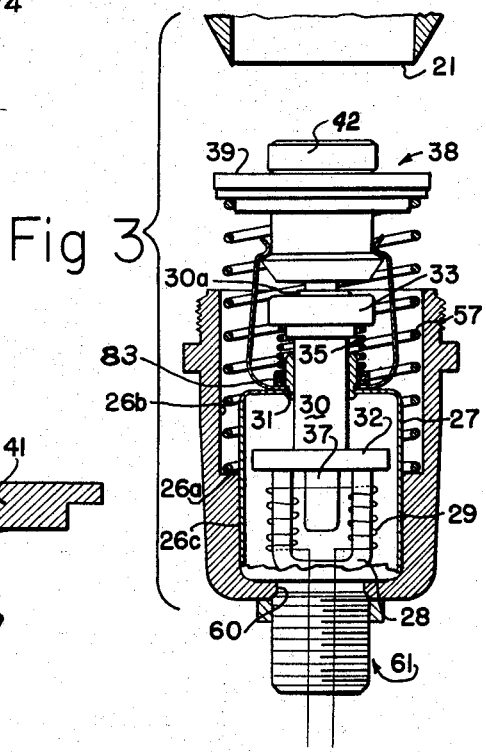
Fig 3
Fig 4
INVENTOR.
Donley S Collins
BY
Seegert & Schwalbach
Attys

United States Patent Office 2,962,036
Patented Nov. 29, 1960

2,962,036

CONTROL DEVICE

Donley S. Collins, Shorewood, Wis., assignor to Baso Inc., Milwaukee, Wis., a corporation of Wisconsin Filed Feb. 13, 1957, Ser. No. 639,908

12 Claims. (Cl. 137—66)

This invention relates to power units for thermoelectric safety devices and more particularly relates to compact power units with increased sealing force.

Safety shut-off valves for shutting off the fuel flow responsive to pilot outage are a necessity in the control of fluid fuels and the like. Heretofore most all commercial thermoelectric power units for safety valves of the type which, when energized, are inoperable to attract an armature, but are operable to retain same after movement to attracted relation have used a single spring to cause both "drop-out" of the armature and to provide the sealing force of the valve upon the valve seat.

The characteristic of valves of this nature is that as the size of the valve increases (capacity), the amount of sealing force needed to seal the valve against the valve seat increases and hence a more powerful spring to provide this increased sealing force is needed. To accommodate these larger springs for increased capacity valves larger magnetic "power units" must be provided. It is to be remembered that there is only limited power available from a thermoelectric generator and hence larger power units are many times out of the question. Further, it is very desirable from a manufacturing viewpoint to use a standard size "power unit" rather than a variety of "power units" in the various valves. It is especially desirable to have a standard power unit for thermoelectric safety devices wherein the magnetic characteristics of the power units are substantially the same wherefore the extremely tight tolerances required may be maintained through standardization independent of the size of the valve or control device to which it is to be applied.

It is, therefore, a general object of this invention to provide an improved standard power unit so constructed that it affords a valve sealing force of any magnitude desired without corresponding change in the magnetic characteristics of said power unit.

Another object of the invention is to provide a device of the aforementioned characteristics wherein the point at which the armature leaves the pole faces of the electromagnet under a predetermined spring bias remains a constant in devices of varying size and is independent of the valve sealing force employed to close the valve.

Another object of the invention is to provide a device as above characterized wherein the length of stroke of the valve may be varied as desired.

Another object of the invention is to provide a safety device of the aforestated character which includes a latch such that upon the occurrence of either vibrational forces, or unsafe pilot condition the device will be actuated to a safety position.

Another object of the invention is to provide a power unit as above described which is compact in all dimensions, is well adapted for mass manufacture, is easily installed by non-skilled technicians, and is otherwise well adapted for the purposes for which it was designed.

The novel features which are characteristic of the invention are set forth with particularity in the appended claims. The invention, itself, however, both as to its organization and its method of operation, together with additional objects and advantages thereof, will best be understood by the following description of specific embodiments when read in connection with the accompanying drawings, in which:

Figure 2 is a fragmentary sectional view of the assembly depicted in Figure 1 rotated 180° and showing the relative position of the parts when the reset means is fully depressed;

Figure 3 is a fragmentary sectional view, similar to Figure 2, showing the relative position of the parts when the assembly is cocked and energized, the reset means being in retracted position;

Figure 4 is an enlarged fragmentary sectional view of the combination valve backing member and cam member shown in Figures 1 to 3;

Figure 5 is a perspective view of a leaf spring used in the device depicted in Figures 1 to 3 inclusive.

Figure 1:
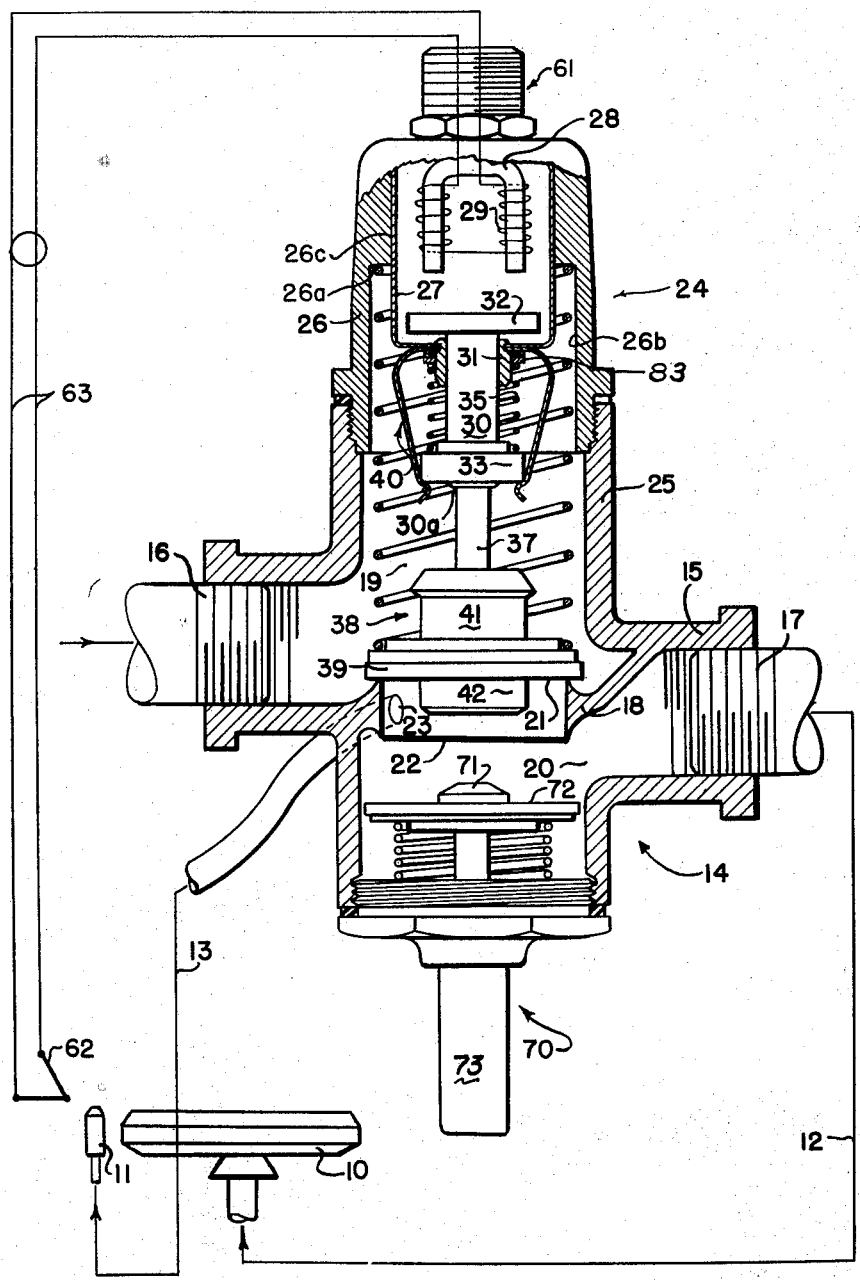
Figure 1 is a view, partially in section, of a novel power unit assembly for controlling main and pilot burners, said assembly being shown in its deenergized position.

While the improved power unit is shown and described in connection with a valve, it will become apparent in the following description that the power unit is equally useful for actuation of other control members such as those in switches and the like.

Before describing the assembly in detail, a short summary of the major components and their cooperation may be helpful. Essentially, the assembly comprises a thermoelectrically powered electromagnet which is unable to attract an armature but is able to hold the armature attracted when moved to attracted position by outside means such as reset means. The electromagnet holds the armature against the bias of a drop-out spring. The drop-out spring does not, in distinction to commercial devices used heretofore, provide the sealing force for the control member or valve, but rather is operable to trigger or unlatch a holding spring whereupon a separate control member or valve biasing spring is operable to seal the valve against the valve seat. The force of the sealing spring means may be of any desired magnitude provided that the holding force of the holding or latching spring means is of a slightly larger magnitude so that in latched relation the holding spring will hold the valve assembly against the bias of the sealing spring. However, when the bias of drop-out spring is added to that of the sealing spring, the combination provides a bias of a magnitude that is operable to overcome the bias of the holding spring means releasing the valve assembly for movement. The sealing spring 57 then takes over and seals the valve against the seat as aforementioned.

Referring now to Figure 1 of the drawings, in more detailed description of the device and its operation, a main burner 10 and pilot burner 11 may be supplied with fluid fuel under pressure from a suitable source (not shown) through conduits 12 and 13. Flame sensitive means such as a thermoelectric generator 62 is associated with the pilot burner 11 to control valve means 14, the latter being interposed in the conduits to control the flow of fluid fuel and assuming an operating or open position, or a safety or closed position in accordance with existence of a flame at said pilot burner 11 as shall now be described.

More particularly, the valve means 14 comprises a casing 15 having an inlet 16, an outlet 17, there being an interior partition wall 18 separating an inlet chamber 19, an outlet chamber 20. As shown, the partition wall 18 may be formed with a pair of oppositely disposed valve seats 21 and 22 and a pilot outlet 23 intermediate thereof, the latter being connected to the pilot conduit 13.

Safety shut-off means 24 may be manufactured as a separate subassembly and may be generally referred to as a "power unit and valve assembly." As shown, the power unit and valve assembly 24 is disposed within the inlet chamber 19 to shut off all fuel flow through the valve means 14 responsive to pilot outage. To this end, the valve casing 15 may be formed with an upstanding tubular boss 25 which is adapted to threadably receive the power unit and valve assembly. The power unit and valve assembly 24 comprises an inverted cup-shaped outside casing member 26 which sealingly and threadedly engages the boss 25 as shown. The casing 26 may be formed with a small axial aperture 60 (Figures 2 and 3), and a large axial bore 26c and counterbore 26b, the bore and counterbore forming a shoulder 26a intermediate the axial dimension of the casing 26.

Fixedly disposed in the large axial bore 26c is an inner tubular housing or hood member 27, the outer diameter of which is smaller than the diameter of the counterbore 26b. A generally U-shaped magnet core 28 is fixedly attached to and disposed within the hood member 27 and has an energizing winding 29 wound on the legs thereof. A lead connector assembly 61 is disposed in the casing aperture 60 and serves to provide a suitable connection for the thermoelectric generator lead wires 63 with the coil 29 and to mount the hood member 27 and magnet 28 firmly in place in bore 26c.

An armature stem 30 slidably extends through a suitable bearing 31, the latter being centrally disposed within a suitable aperture in the inner end wall of the hood member 27. An armature 32 is fixedly attached to one end of stem 30 within the hood member, while the other or exterior end of the stem 30 carries a spring loaded annular head member 33 for movement therewith. As best shown in Figure 2, annular stem head member 33 is biased against a suitable washer or E-ring 34 by a coiled spring 35, one end of which abuts the head member 33 and the other engaging the flat surface of a leaf spring spider 40 (to be later described). It is to be noted that washer or E-ring 34 positions or limits head member 33 so that the stem end surface 30a projects axially beyond member 33 a short distance for reasons hereinafter appearing. Spring 35, in addition to loading head member 33 against washer 34, also establishes the drop-out value of the power unit. It may be referred to as the "drop-out" spring since the bias developed when in its compressed state (as shown in Figures 2 and 3) determines the amount of attractive force which must be provided by the electromagnet 28 to prevent movement or "drop-out" of the armature 30. Adjustment means 83, here shown in the form of a plurality of shim washers, is provided to adjust the compression of spring 35 as desired. These shim washers 83 are inserted between the spring spider 40 and the end of drop-out spring 35 to provide a simple means of compensating for variations in the armature and pole face grinds.

As best shown in Figure 2, the armature stem 30 is formed with an axial bore 36 which is adapted to receive a valve subassembly, the latter being relatively movable with respect to the armature 32 and armature stem 30. The valve subassembly may comprise an elongated stem portion 37 which slidably fits within the armature stem bore 36 and a head portion 38 mounted on stem portion 37 for movement therewith. As shown in Figure 2, the head portion 38 comprises a valve facing 39, a combination backing plate and cam member 41, cap member 42 and resilient means 82.

The combination backing and cam member 41 is readily adapted to manufacture by automatic machinery and is best shown in the enlarged sectional view of Figure 4. More particularly, member 41 is of generally elongated annular shape having a central bore 44 and end surfaces 45 and 46. The upper end of bore 44, as viewed in Figure 4, may be formed with a counterbore 45a to form therewith a shoulder 49. As shown in Figure 2, the upper end of elongated stem member 37 is formed with a groove 51 which receives an E-ring 50, the latter being adapted to engage shoulder 49 of the head member 38 to form a somewhat loose connection between the head 38 and the stem portion 37 when parts are assembled.

The surface 47 is the widest portion of annular member 41 and provides the stock that is adapted to act as a back-up plate for suitable valve facing material 39. As shown in Figure 2, surfaces 45 and 47 are offset axially from each other to form a central threaded hub 45b which threadedly engages a complementarily threaded bore 48 in the cap member 82, the latter thus serving to retain the valve facing material 39 in engagement with backing surface 47. Suitable resilient material 52 may be disposed within the bore 48 to engage the head of stem 37 when it bottoms thereon.

Member 41 may be formed with a peripheral shoulder 52 on the under side of the back-up portion, said shoulder being adapted to receive one end of a sealing spring here shown as a helical compression spring 57. As shown, the diameter of shoulder 52 of head member 41 is substantially the same diameter of shoulder 26a of the outer casing with which the other end of spring 57 engages. The spring 57 may be referred to as the sealing spring inasmuch as it provides a bias tending to afford sealing engagement of valve facing 39 on seat 21.

The configurations of the lower part of member 41 as viewed in Figure 4, particularly annular cam surfaces 53, 54, and 55 relate to its coaction with the arms of leaf spring 40 when the device is assembled. To best understand the operative coaction of these cam surfaces, the spring 40 will be first described. As shown in perspective view in Figure 5, leaf spring 40 may be generally U-shaped in configuration having a base portion 40d and a pair of upstanding arms 40a and 40b, the latter having upset end portions 40e and 40f respectively. The base 40d may be formed with a central bore 40c which fits within a suitable circumferential groove 58 in the stem bearing 31 as shown in Figure 2. Thus when the device is assembled, the armature stem 30 is mounted in bearing 31 and valve stem 37 is placed within armature stem bore 36, the upset portions 40e and 40f of spring arms 40a and 40b may be, depending on a variety of conditions, engaged with either surfaces 55, 54 or 53 of member 41 or not engaging any of them as shall be explained in connection with the resetting movement.

Reset means 70 comprising a manually depressable button 73, a flow-interrupter disc 72, and stem head 71 may be coaxially disposed in a suitable boss of casing 15 for coaction with the valve and power unit 24. The parts of the device are so assembled that as the reset button 73 is depressed, flow-interrupter disc 72 engages seat 22 for safe lighting of the pilot burner in a manner well understood in the art. The reset stem head 71, upon seating of disc 72, is operable through a suitable lost motion connection, to engage cap 42 of assembly 38 and move the parts to position shown in Figure 2, i.e., with armature 30 in engagement with magnet 28.

When the apparatus is in the uncocked-deenergized (safety shut off) position shown in Figure 1, the armature stem head 33 engages and spreads the arms 40a and 40b of latching spring 40. As the reset stem head 71 moves valve assembly 38 toward the deenergized reset position shown in Figure 2 against the bias of sealing spring 57, surface 46 of member 41 engages end surface 30a of armature stem 30 and lower cam surface 55 of member 41 engages the upset portions 40e and 40f of spring arms 40a and 40b to cam open and spread the latter. It is to be noted that upon engagement of surface 46 with stem end surface 30a, the bias of drop-out spring 35 also resists the resetting movement. Continuation of the reset movement of member 41 causes the upset portions 40e and 40f to slide over the short cam surface 54 and onto the annular surface 53 of member 41.

While the parts are held in the position shown in Figure 2 by the reset stem head 71, the pilot burner 11 may be ignited, causing thermoelectric generator 62 to be energized to in turn energize magnet windings 29 to thereby create an attractive force with respect to the armature 32 which is now engaging magnet 28. If the pilot burner 11 is operating normally, the attractive force created by the energized windings 29 is greater than the opposite biasing force of drop-out spring 35 and thus the spring 35 is retained in its compressed position by said magnet.

Now, when the reset stem head 71 is retracted to the position shown in Figure 1, the remaining parts assume the cocked-energized position shown in Figure 3, where upset portions 40e and 40f of spring 40 engage cam surface 54 of member 41 under the bias of sealing spring 57. Inasmuch as the latching force of arms 40a and 40b upon surface 54 of member 41 is designed to be greater, as aforementioned, than the biasing force of spring 57, the parts remain in the position shown in Figure 3 until windings 29 deenergize so as to provide less attractive force than the biasing force of drop-out spring 35.

The flow of fuel to both burners is now under control of the thermoelectric generator 62. If for any reason the pilot burner goes out, the magnet 28 deenergizes and drop-out spring 35 is released to add its bias to the bias of sealing spring 57, thereby causing cam surface 54 of member 41 to move relative to member 40 releasing the valve head portion 38 for movement to the closed position shown in Figure 1.

It is apparent that while the parts are in the cocked-energized position shown in Figure 3, that any severe vibrational forces upon valve assembly head portion 38 such as might be caused by unusual gas pressures, etc., will also cause cam surface 54 to spread arms 40a and 40b allowing the valve head portion to seat for safety purposes. Also to be noted is that the amount of travel of the valve assembly head portion 38 is not limited to the characteristics of the drop-out spring 35 but is limited only by the characteristics of sealing spring 57 which may be designed as desired. Thus the assembly affords considerably more travel than any known commercial device.

Although a specific embodiment of the invention has been shown and described, it is with full awareness that many modifications thereof are possible. The invention, therefore, is not to be restricted except insofar as is necessitated by the prior art and the appended claims.

What is claimed in the invention is:

1. An electromagnetic control device comprising an electromagnet, an armature biased toward a retracted position with respect to said electromagnet and movable against said bias to an attracted position in which it is adapted to be held by energization of said electromagnet, a control member having an operating position and biased toward a safety position, releasable latching means capable of by itself holding said control member in its operating position against the normal bias on the latter and releasable in response to an increase in said bias to a predetermined value, and means operatively associated with said armature and control member operable on movement of said armature toward its retracted position to increase the bias on said control member to above said predetermined value and thereby effect release of said latching means for movement of said control member toward its safety position under its bias.

2. An electromagnetic control device comprising an electromagnet, an armature biased toward a retracted position with respect to said electromagnet and movable against said bias to an attracted position in which it is adapted to be held by energization of said electromagnet, a safety shut-off valve member having an open position and biased toward a closed position, releasable latching means capable of by itself holding said valve member open against the normal closing bias on the latter and releasable in response to an increase in said closing bias to a predetermined value, and means operatively associated with said armature and valve member operable on movement of said armature toward its retracted position to increase the closing bias on said valve member to above said predetermined value and thereby effect release of said latching means and closing movement of said valve member.

3. An electromagnetic control device comprising an electromagnet, an armature movable between attracted and retracted positions with respect to said electromagnet, first spring means biasing said armature toward said retracted position, said electromagnet when energized being operable to hold said armature in said attracted position when moved thereto against said biasing means, a control member having operating position and safety positions, second spring means biasing said control member toward said safety position, releasable latching means capable of by itself holding said control member in its operating position against the bias of said second biasing means and releasable in response to an increase in the bias on said control member to a predetermined value, and means operatively associated with said armature and control member operable on movement of said armature toward its retracted position to increase the bias on said control member to above said predetermined value and thereby effect release of said latching means for movement of said control member toward its safety position.

4. An electromagnetic control device comprising an electromagnet, an armature movable between attracted and retracted positions with respect to said electromagnet, first spring means biasing said armature toward said retracted position, said electromagnet when energized being operable to hold said armature in said attracted position when moved thereto against said biasing means, a safety shut-off valve member having open and closed positions, second spring means biasing said valve member toward closed position, releasable latching means capable of by itself holding said valve member open against the bias of said second biasing means and releasable in response to an increase in the closing bias on said valve member to a predetermined value, and means operatively associated with said armature and valve member operable on movement of said armature toward its retracted position to increase the closing bias on said valve member to above said predetermined value and thereby effect release of said latching means and closing movement of said valve member.

5. An electromagnetic control device comprising an electromagnet, an armature movable between attracted and retracted positions with respect to said electromagnet, enclosure means for said electromagnet and armature comprising a wall formed with an opening, a tubular stem fixed to said armature and journaled in said wall opening for axial sliding movement with movement of said armature toward and away from said electromagnet, a control member movable between an operating in which a portion thereof is in the path of movement of said tubular stem and a safety position, a stem fixed to said control member and axially slidable within said tubular armature stem, first means biasing said armature toward its retracted position, second means biasing said control member toward its safety position, and releasable latching means capable of holding said control member in its operating position against the bias of said second biasing means and releasable in response to an increase in said bias to a predetermined value, said armature stem on movement of said armature toward its retracted position being movable into engagement with said control member to increase the bias thereon to above said predetermined value and thereby effect release of said latching means and movement of said control member toward its safety position.

6. An electromagnetic control device comprising an electromagnet, an armature movable between attracted and retracted positions with respect to said electromagnet, enclosure means for said electromagnet and armature comprising a wall formed with an opening, a tubular stem fixed to said armature and journaled in said wall opening for axial sliding movement with movement of said armature toward and away from said electromagnet, means defining a valve seat, a valve stem axially slidable within said tubular armature stem, a safety shutoff valve member carried by said valve stem exteriorly of said wall and movable therewith between open position in which a portion thereof is disposed in the path of movement of said tubular stem and a closed position with respect to said valve seat, first means biasing said armature toward its retracted position, second means biasing said valve member toward its closed position, and releasable latching means capable of holding said valve member open against the closing bias of said second biasing means and releasable in response to an increase in the closing bias on said valve member to a predetermined value, said armature stem on movement of said armature toward its retracted position being movable into engagement with said valve member to increase the closing bias thereon to above said predetermined value and thereby effect release of said latching means and closing movement of said valve member.

7. An electromagnetic control device comprising an electromagnet, an armature biased toward a retracted position with respect to said electromagnet and movable against said bias to an attracted position in which it is adapted to be held by energization of said electromagnet, a control member having an operating position and biased toward a safety position, releasable latching means for by itself holding said control member in its operating position when moved thereto against its bias, reset means for simultaneously moving said armature in one direction toward its attracted position and said control member in the same direction toward its operating position, and means operatively associated with said armature for effecting release of said control member from said latching means on movement of said armature toward its retracted position.

8. An electromagnetic control device comprising an electromagnet, an armature biased toward a retracted position with respect to said electromagnet and movable against said bias to an attracted position in which it is adapted to be held by energization of said electromagnet, a safety shut-off valve member having an open position and biased toward a closed position, releasable latching means for by itself holding said valve member open when moved thereto against its bias, reset means for simultaneously moving said armature in one direction toward its attracted position and said valve member in the same direction toward its open position and means operatively associated with said armature for effecting release of said valve member from said latching means on movement of said armature toward its retracted position.

9. In a thermoelectrically energized valve, a power unit and valve assembly comprising a thermoelectrically energized electromagnet and an armature cooperable therewith, a valve member, a two piece lost motion connection between said armature and valve member, the first of said two pieces being movable with said armature and the second being movable with said valve, a drop-out spring coacting with said first piece biasing it and said armature against the attractive force of said electromagnet and with a force less than the attractive force of said electromagnet when energized, a second spring acting upon said second piece and upon said valve with a force that may exceed the attractive force of said electromagnet for said armature, and spring means for holding said valve against the force of said second spring, said drop-out spring acting through said first piece on release of said armature from said electromagnet to aid the bias exerted on said valve member by said second spring and thereby overcome the holding action of said holding means to effect release of said valve member for movement under the bias of said second spring.

10. In a thermoelectrically energized valve, a power unit and valve assembly comprising a thermoelectrically energized electromagnet and an armature cooperable therewith, a valve member, a two piece lost motion connection between said armature and valve member, the first of said two pieces being movable with said armature and the second being movable with said valve, a drop-out spring coacting with said first piece biasing it and said armature against the attractive force of said electromagnet and with a force less than the attractive force of said electromagnet when energized, a second spring acting upon said second piece and upon said valve with a force that may exceed the attractive force of said electromagnet for said armature, and spring means comprising a generally U-shaped leaf spring having spaced extending arms, said arms being adapted to engage said second piece of said two piece lost motion connection for holding said valve against the force of said second spring, said drop-out spring acting through said first piece on release of said armature from said electromagnet to aid the bias exerted on said valve member by said second spring and thereby overcome the holding action of said holding means to effect release of said valve for movement under the bias of said second spring.

11. In a thermoelectrically energized valve, a power unit and valve assembly comprising a thermoelectrically energized electromagnet and an armature cooperable therewith, a valve member, a two piece lost motion connection between said armature and valve member, the first of said two pieces being movable with said armature and the second being movable with said valve, a drop-out spring coacting with said first piece biasing it and said armature against the attractive force of said electromagnet and with a force less than the attractive force of said electromagnet when energized, adjustment means for varying the bias of said drop-out spring, a second spring acting upon said second piece and upon said valve with a force that may exceed the attractive force of said electromagnet for said armature, and spring means for holding said valve against the force of said second spring, said drop-out spring acting through said first piece on release of said armature from said electromagnet to aid the bias exerted on said second piece and said valve member by said second spring and thereby overcome the holding action of said holding means to effect release of said valve member for movement under the bias of said second spring.

12. In a thermoelectrically energized valve, a power unit and valve assembly comprising a thermoelectrically energized electromagnet and an armature cooperable therewith, a valve member, a two piece lost motion connection between said armature and valve member, the first of said two pieces being movable with said armature through a first distance and the second being movable with said valve through a second distance independent of the movement of said first piece, a drop-out spring coacting with said first piece biasing it and said armature against the attractive force of said electromagnet and with a force less than the attractive force of said electromagnet when energized, a second spring acting upon said second piece and upon said valve with a force that may exceed the attractive force of said electromagnet for said armature, and spring means for holding said valve against the force of said second spring, said drop-out spring acting through said first piece on release of said armature to aid the bias exerted on said second piece and said valve member by said second spring and thereby overcome the holding action of said holding means to effect release of said valve member for movement under the bias of said second spring.

References Cited in the file of this patent

UNITED STATES PATENTS

| | | |
|---|---|---|
| 2,321,095 | Mantz | June 8, 1943 |
| 2,455,521 | Rice et al. | Dec. 7, 1948 |
| 2,652,065 | Kutzler | Sept. 15, 1953 |